(12) United States Patent
Schick

(10) Patent No.: US 6,795,400 B1
(45) Date of Patent: Sep. 21, 2004

(54) PACKET LOSS SERVICE-LEVEL GUARANTEE MONITORING AND CLAIM VALIDATION SYSTEMS AND METHODS

(75) Inventor: Irvin C. Schick, Newton, MA (US)

(73) Assignees: Verizon Corporate Services Group Inc., New York, NY (US); BBNT Solutions LLC, Cambridge, MA (US); Genuity Inc., Burlington, MA (US)

( * ) Notice: Subject to any disclaimer, the term of this patent is extended or adjusted under 35 U.S.C. 154(b) by 0 days.

(21) Appl. No.: 09/450,549

(22) Filed: Nov. 30, 1999

(51) Int. Cl.[7] .............................................. H04L 12/26
(52) U.S. Cl. ....................................... 370/236; 370/248
(58) Field of Search ................................ 370/229, 230, 370/231, 235, 236, 236.1, 236.2, 237, 238, 238.1, 248, 241, 252, 253, 395.2, 395.41, 395.42, 395.43; 709/223, 224, 238, 240, 241, 242

(56) References Cited

U.S. PATENT DOCUMENTS

| | | | | |
|---|---|---|---|---|
| 5,042,027 A | * | 8/1991 | Takase et al. | 370/252 |
| 5,687,167 A | * | 11/1997 | Bertin et al. | 370/254 |
| 5,805,602 A | * | 9/1998 | Cloutier et al. | 370/516 |
| 6,034,956 A | * | 3/2000 | Olnowich et al. | 370/388 |
| 6,181,680 B1 | * | 1/2001 | Nagata et al. | 370/248 |
| 6,201,810 B1 | * | 3/2001 | Masuda et al. | 370/395.32 |
| 6,363,053 B1 | * | 3/2002 | Schuster et al. | 370/230 |
| 6,487,604 B1 | * | 11/2002 | Rochford et al. | 709/238 |
| 6,594,268 B1 | * | 7/2003 | Aukia et al. | 370/400 |

OTHER PUBLICATIONS

Sun Microsystems, Inc., "Sun Launches Suntone Program to Provide Quality of Service Guarantees For Network–Based Services," Oct. 12, 1999.

* cited by examiner

Primary Examiner—Kwang Bin Yao
(74) Attorney, Agent, or Firm—Leonard C. Suchyta, Esq.; Joel Wall; Finnegan, Henderson, Farabow et al.

(57) ABSTRACT

A system monitors performance in a network (130) having several routers (210). The system determines a roundtrip path in the network (130) between a source and a destination, identifies routers (210) located on the path, collects performance data from the identified routers (210), and compares the performance data to at least one performance criteria to determine compliance with a service-level guarantee.

33 Claims, 7 Drawing Sheets

PACKET LOSS SERVICE-LEVEL GUARANTEE MONITORING AND CLAIM VALIDATION SYSTEMS AND METHODS

RELATED APPLICATION

This application is related to copending application Ser. No. 09/450,601, entitled "Connectivity Service-Level Guarantee Monitoring and Claim Validity Systems and Methods," filed concurrently herewith, and incorporated herein by reference.

BACKGROUND OF THE INVENTION

A. Field of the Invention

The present invention relates generally to quality of service guarantees and, more particularly, to systems and methods for providing packet loss service-level guarantees for data network communication.

B. Description of Related Art

In the highly competitive Internet service provision industry, service-level guarantees (SLGs) have become an extremely important market differentiator. The trend in SLGs has included a movement toward service contracts that attach financial penalties to failures to meet certain key network performance criteria. Since the industry remains in a state of flux, service providers must constantly extend and revise their SLGs to compete. As a result, service providers face the dilemma of formulating meaningful performance criteria to attract and retain business, while avoiding imposing a financially ruinous burden on the company.

An important aspect of SLGs is compliance monitoring. Currently, SLGs are reactive in the sense that customers must monitor performance and submit a claim when they experience poor service. At the same time, however, the service provider must monitor its own performance, both to make sure that sufficient resources are available and its SLGs are met, and to verify and validate customer claims.

A typical SLG criteria includes the measurement of end-to-end packet loss (i.e., a measure of packet drops between a source and a destination). Conventional systems measure packet loss using dedicated Internet Control Message Protocol (ICMP) packets. These conventional systems send ping packets to a reliable target and determine the round-trip packet loss rate from the fraction of unacknowledged pings.

Using ICMP to measure packet loss, however, has several disadvantages. First, packet characteristics, such as size and frequency, used to measure the packet loss typically do not correspond to the packet characteristics of the customers' data traffic. Second, finding reliable targets to ping is not always easy. Third, routers are usually unreliable because they give low priority to responding to pings during busy periods.

As a result, a need exists for a system that facilitates measurement of packet loss to validate customer SLG claims.

SUMMARY OF THE INVENTION

Systems and methods consistent with the present invention address this need by using readily-available performance data, such as link-level drop statistics, to measure end-to-end packet loss and validate customer SLG claims.

In accordance with the purpose of the invention as embodied and broadly described herein, a system monitors performance in a network having several routers. The system determines a path in the network between a source and a destination, identifies routers located on the path, collects performance data from the identified routers, and compares the performance data to at least one performance criteria to determine compliance with a service-level guarantee.

In another implementation consistent with the present invention, a method validates customer claims relating to performance in a network having several routers. The method includes receiving one of the customer claims, the claim identifying a path in the network between a source and a destination and a time interval for which degraded performance was experienced; identifying routers located on the path; collecting performance data from the identified routers for several periods, at least some of the periods overlapping the time interval; weighting the performance data based on an amount of overlap of the corresponding period with the time interval; combining the weighted performance data for each of the identified routers to obtain path performance data; and determining compliance with a service-level guarantee based on the path performance data.

In a further implementation consistent with the present invention, a method for validating a claim relating to a service-level guarantee includes receiving the claim from a customer, the claim identifying a first path in a network from a source to a destination, a second path from the destination to the source, and a time interval for which degraded performance was experienced in the network; and validating the claim by collecting performance data reflecting performance of communication along the first and second paths and determining compliance with the service-level guarantee based on the collected performance data.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention facilitate packet loss service-level guarantee (SLG) monitoring and verification by collecting link-level packet loss data and determining compliance with the service-level guarantee using the collected data.

Exemplary System

Figure 1:
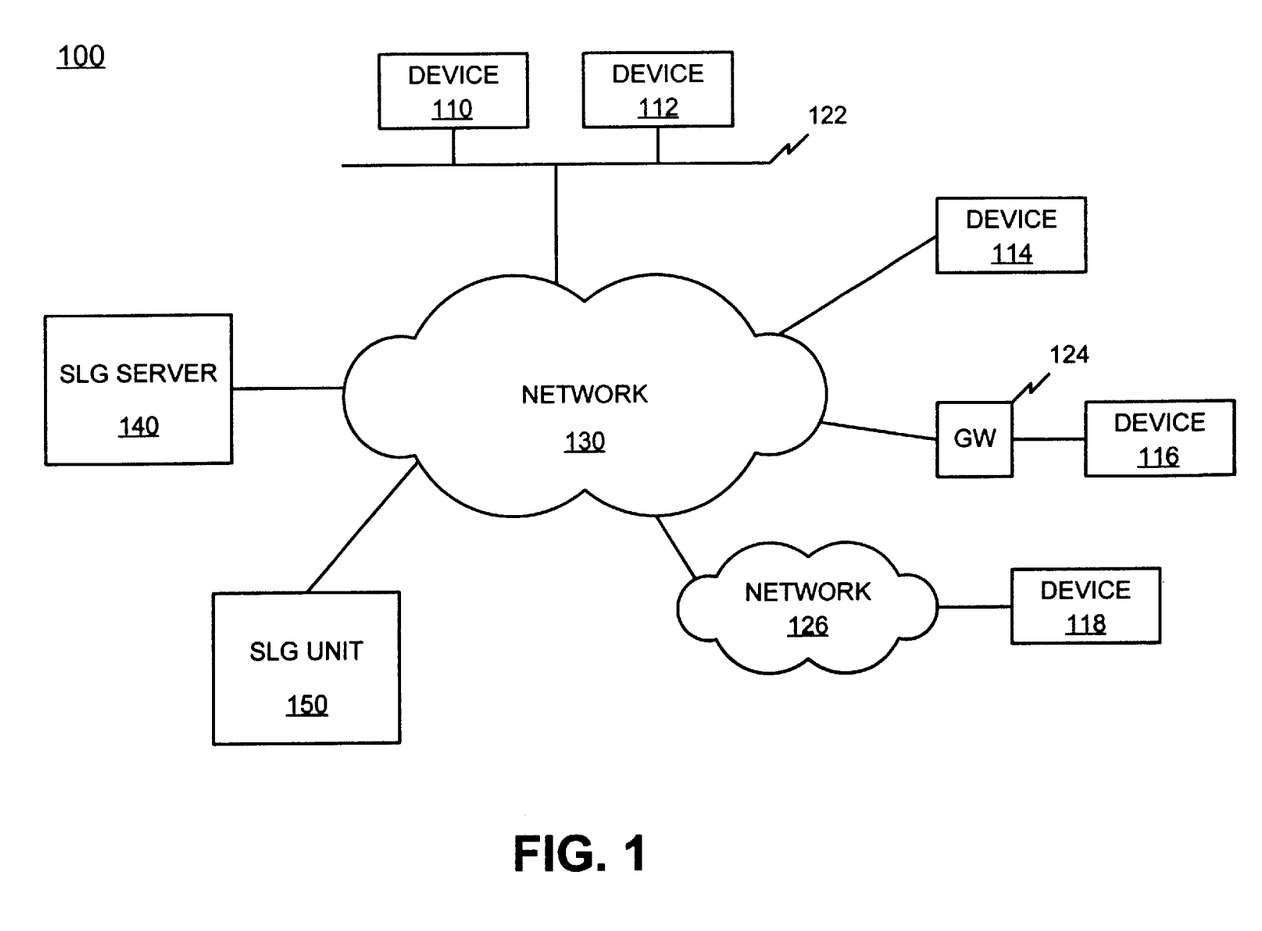
FIG. 1 is a diagram of an exemplary system in which systems and methods consistent with the present invention may be implemented.

FIG. 1 is an exemplary system 100 in which systems and methods consistent with the present invention may be implemented. The system 100 includes several devices 110–118 connected to a network 130, a service-level guarantee (SLG) server 140, and a SLG unit 150. The devices 110–118 may include any mechanism capable of communicating over the network 130, including, for example, a personal computer, a personal digital assistant (PDA), a cellular or wireless communications device, such as a mobile telephone, etc.

The devices 110–118 may connect to the network 130 using wired or wireless communication mechanisms. For example, devices 110 and 112 connect to the network 130 via a local area network (LAN) 122; device 114 connects directly to the network 130 using a wired or wireless connection; device 116 connects to the network 130 via a conventional gateway 124; and device 118 connects to the network 130 via another network 126, such as the Internet, an intranet, a wide area network (WAN), a LAN, or a similar network. FIG. 1 shows five devices connected to the network 130 for simplicity. One skilled in the art would recognize that different numbers of devices may connect to the network 130 in a number of different ways.

Figure 2:
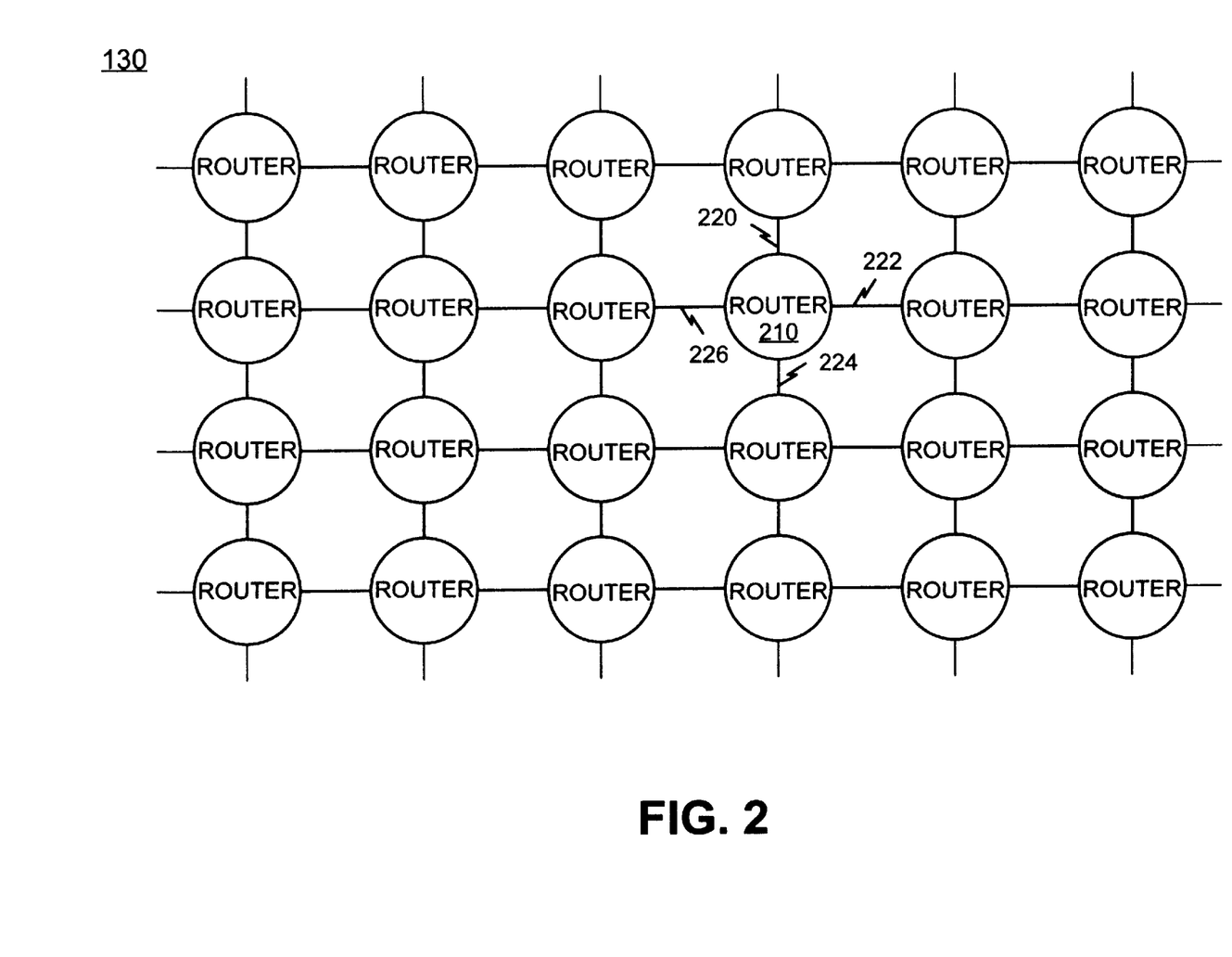
FIG. 2 is a detailed diagram of an exemplary network in the system of FIG. 1.

The network 130 is a packet routing network of a service provider that may include the Internet, an intranet, a wide area network (WAN), etc. FIG. 2 is an exemplary diagram of the network 130 consistent with the present invention, including several interconnected routers. Each of the routers connects to its nearest neighbors. For example, router 210 connects to its neighbor to the north via a communications path 220, to its neighbor to the east via a communications path 222, to its neighbor to the south via a communications path 224, and to its neighbor to the west via a communications path 226. Other network configurations are also possible.

Figure 3:
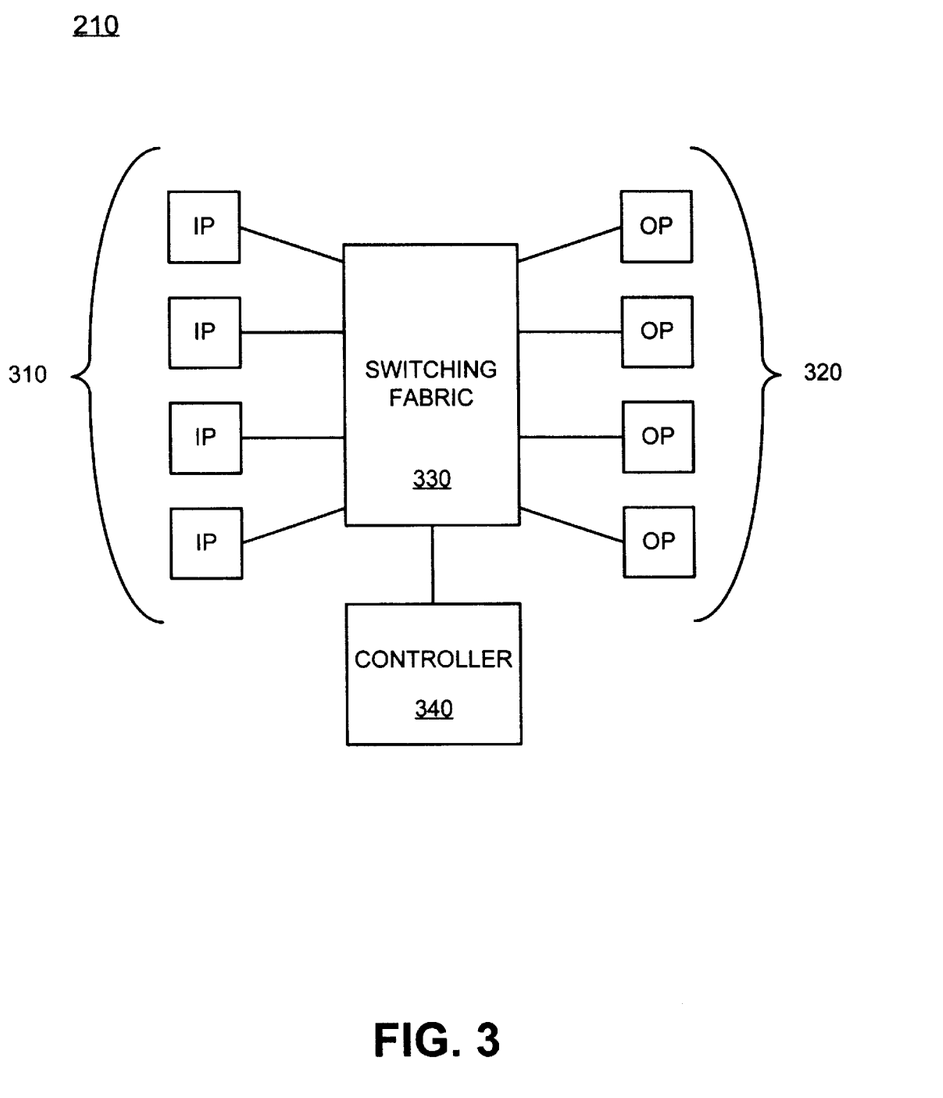
FIG. 3 is a detailed diagram of an exemplary router in the network of FIG. 2.

FIG. 3 is an exemplary diagram of a router 210 consistent with the present invention. The router 210 includes several input buffers 310, several output buffers 320, a switching fabric 330, and a controller 340. The input buffers 310 temporarily store packets received from a neighboring node or a source device, such as one of the devices 110–118 (FIG. 1). The output buffers 320 temporarily store packets for transmission to a neighboring node or a destination device, such as one of the devices 110–118. The switching fabric 330 may include a conventional switch fabric to connect the input buffers 310 to the output buffers 320. The controller 340 controls the operation of the router 210. The controller 340 may include a processor, microprocessor, digital signal processor, etc. that analyzes incoming packets to configure the switching fabric 330 to send the packets to the appropriate output buffers 320.

Figure 4:
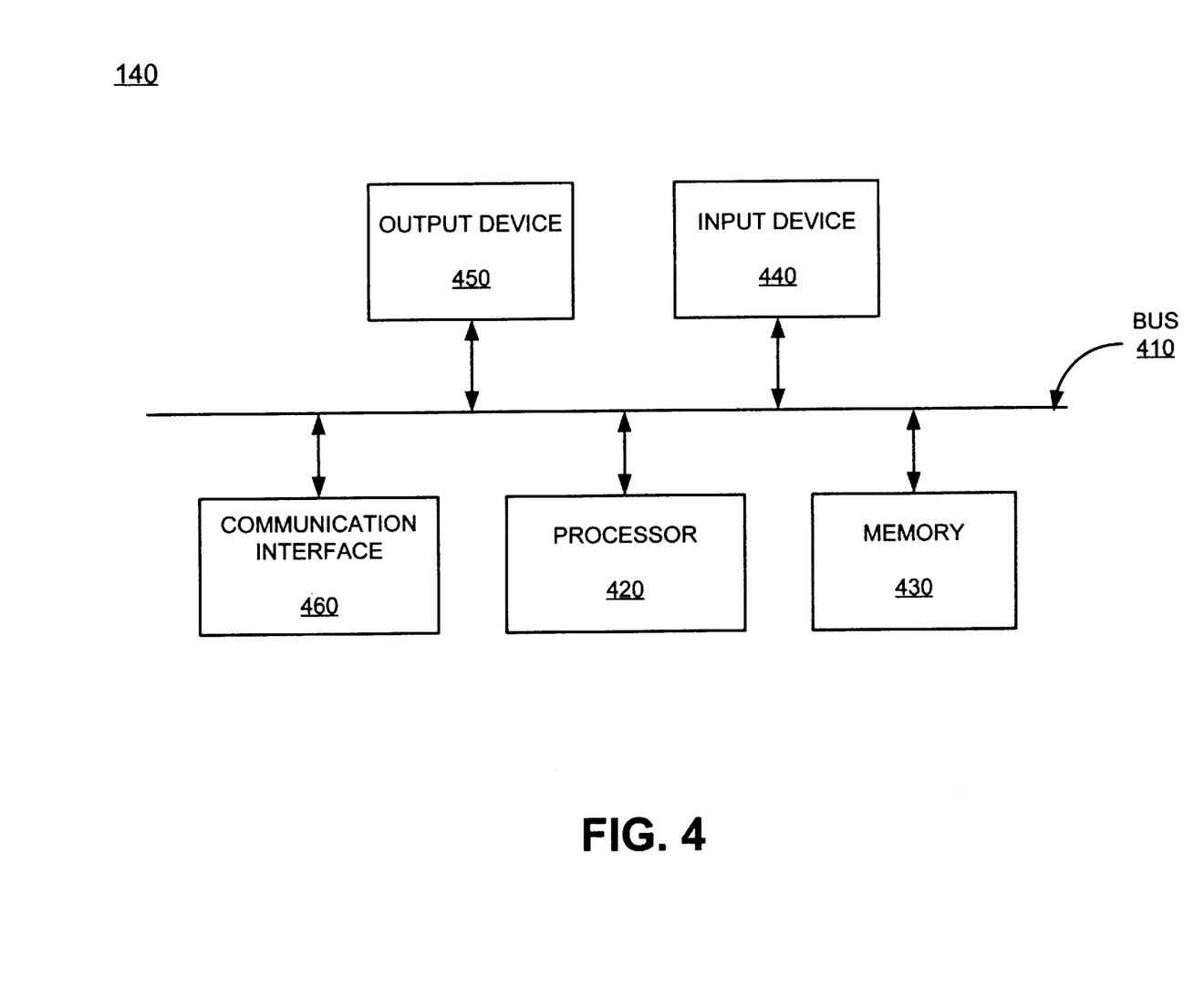
FIG. 4 is a detailed diagram of an exemplary service-level guarantee (SLG) server in the system of FIG. 1.

Returning to FIG. 1, the SLG server 140 obtains traceroutes including paths contained within the network 130. FIG. 4 is an exemplary diagram of the SLG server 140 consistent with the present invention. The SLG server 140 includes a bus 410, a processor 420, a memory 430, an input device 440, an output device 450, and a communication interface 460. The bus 410 permits communication among the components of the SLG server 140.

The processor 420 may include any type of conventional processor or microprocessor that interprets and executes instructions. The memory 430 may include a RAM or another dynamic storage device that stores information and instructions for execution by the processor 420; a ROM or another type of static storage device that stores static information and instructions for use by the processor 420; and/or some other type of magnetic or optical recording medium and its corresponding drive.

The input device 440 may include any conventional mechanism that permits an operator to input information into the SLG server 140, such as a keyboard, a mouse, a pen, voice recognition and/or biometric mechanisms, etc. The output device 450 may include any conventional mechanism that outputs information to the operator, including a display, a printer, a pair of speakers, etc. The communication interface 460 may include any transceiver-like mechanism that enables the SLG server 140 to communicate with other devices and/or systems. For example, the communication interface 460 may include mechanisms for communicating via a network, such as network 130 (FIG. 1).

Figure 5:
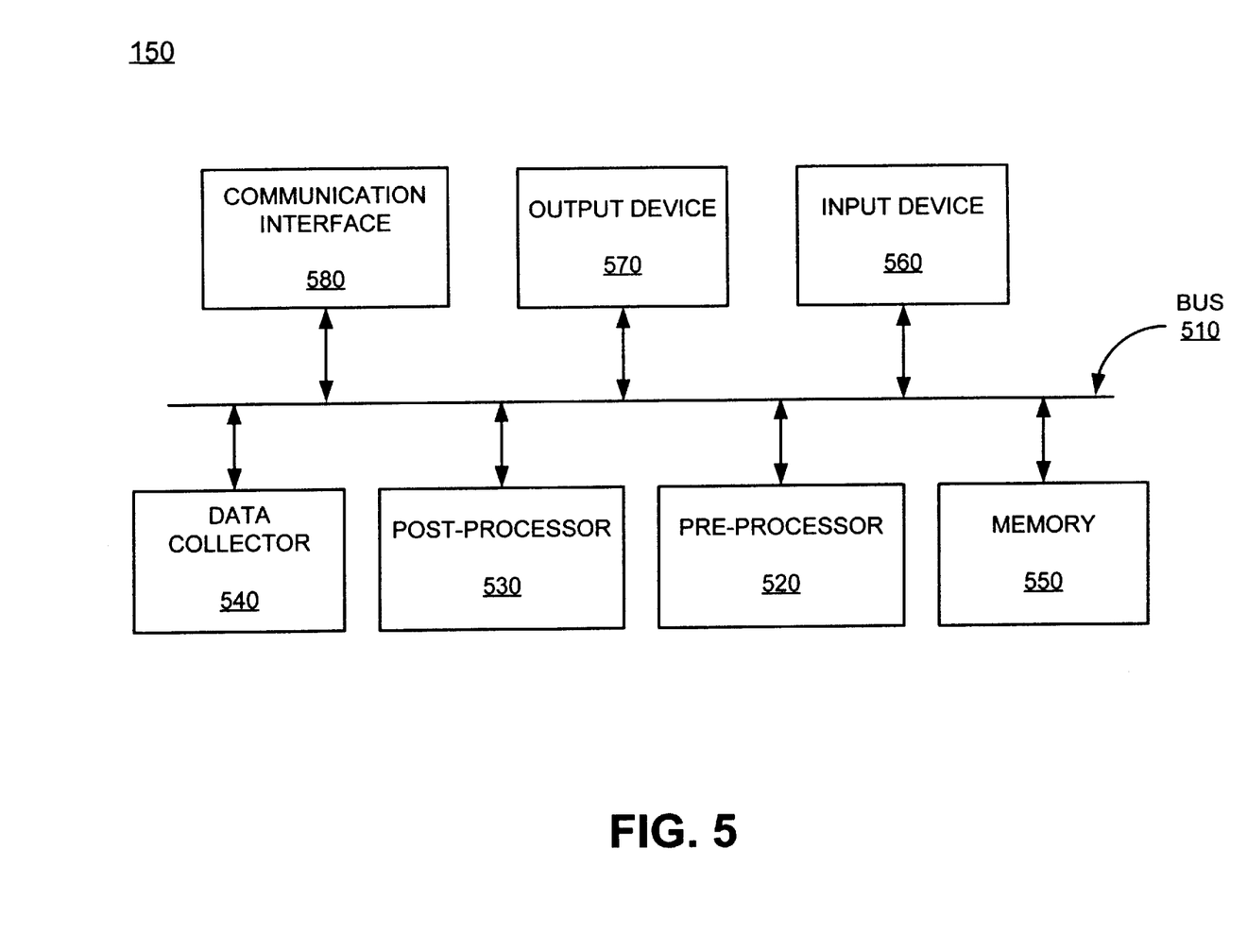
FIG. 5 is a detailed diagram of an exemplary SLG unit in the system of FIG. 1.

Returning to FIG. 1, the SLG unit 150 monitors and verifies path-long packet loss in the network 130. FIG. 5 is an exemplary diagram of the SLG unit 150 consistent with the present invention. The SLG unit 150 includes a bus 510, a pre-processor 520, a post-processor 530, a data collector 540, a memory 550, an input device 560, an output device 570, and a communications interface 580. The bus 510 permits communication among the components of the SLG unit 150.

The pre-processor 520, the post-processor 530, and the data collector 540 may include any type of conventional processor or microprocessor that interprets and executes instructions. These components may be implemented as physically separate components or integrated into a single physical device. Further, these components may be implemented in hardware, software, or a combination of hardware and software. The pre-processor 520 parses customer-supplied traceroutes to identify routers located in the traceroutes. The data collector 540 continuously gathers statistics regarding network routers, such as link-level discard, error, packet, and octet rates, and stores them for later use by the post-processor 530. The post-processor 530 analyzes the statistics gathered by the data collector 540 and determines whether network performance fell below the level specified by the SLG.

The memory 550 may include a RAM or another dynamic storage device that stores information and instructions for execution by the pre-processor 520, the post-processor 530, and/or the data collector 540; a ROM or another type of static storage device that stores static information and instructions for use by the pre-processor 520, the post-processor 530, and/or the data collector 540; and/or some other type of magnetic or optical recording medium and its corresponding drive.

The input device 560 may include any conventional mechanism that permits an operator to input information into the SLG unit 150, such as a keyboard, a mouse, a pen, voice recognition and/or biometric mechanisms, etc. The output device 570 may include any conventional mechanism that outputs information to the operator, including a display, a printer, a pair of speakers, etc. The communication interface 580 may include any transceiver-like mechanism that enables the SLG unit 150 to communicate with other devices and/or systems. For example, the communication interface 580 may include mechanisms for communicating via a network, such as network 130 (FIG. 1).

Exemplary System Processing

Figure 6:
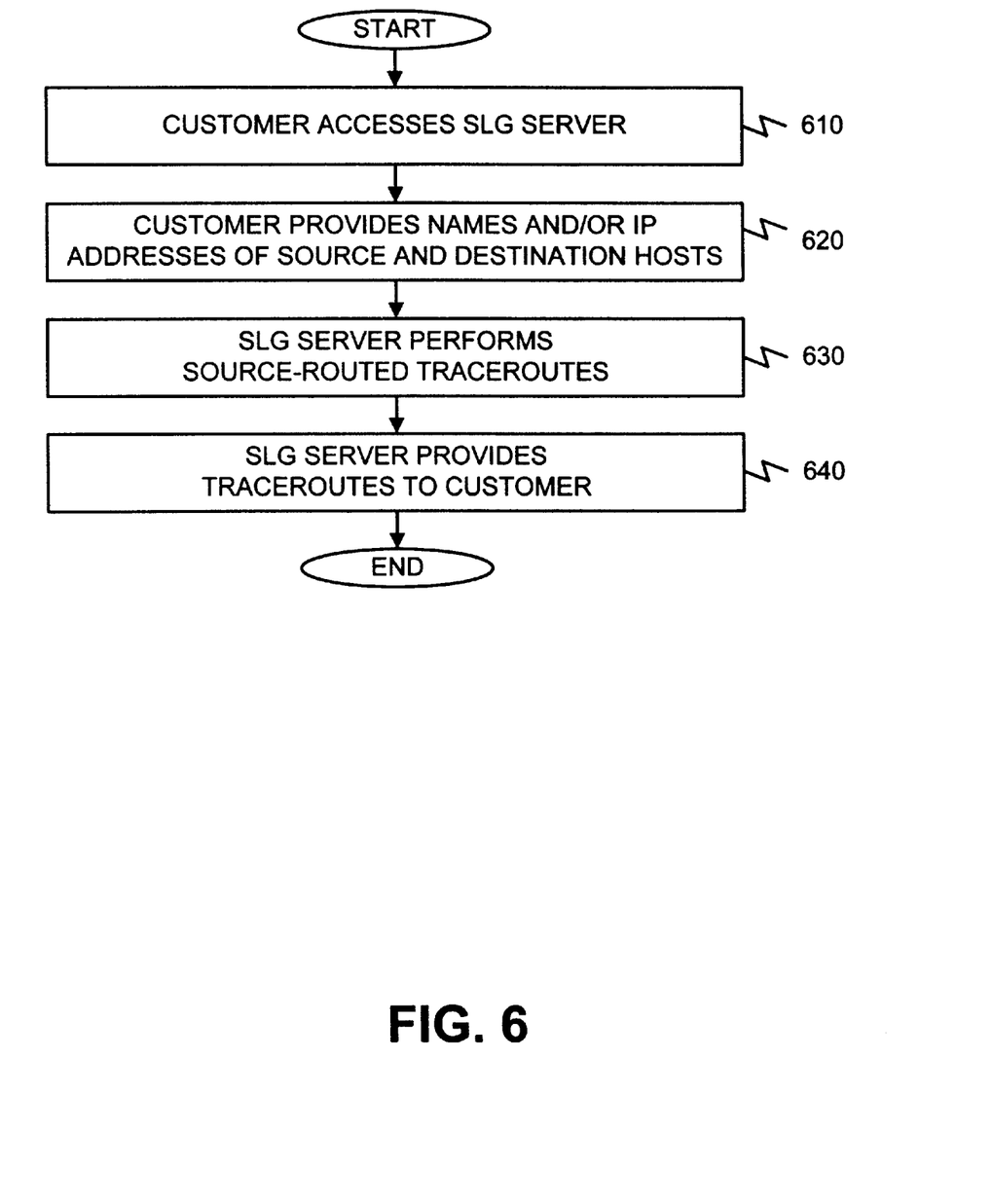
FIG. 6 is a flowchart of processing for obtaining traceroutes in a manner consistent with the present invention.

FIG. 6 is a flowchart of processing for obtaining traceroutes in a manner consistent with the present invention. When a customer experiences a malfunction or degraded performance, the customer obtains a traceroute of the path experiencing the malfunction or degraded performance. Because the customer may not have the ability to perform a traceroute from the customer's source host to the destination host, the customer may obtain the capability by accessing the SLG server 140 [step 610]. For example, the SLG server 140 may be accessible through a web site (i.e., a site or location on the Internet) to provide the traceroutes. Prior to performing the traceroutes, the SLG server 140 may request that the customer enter a customer name and possibly an identifier.

The SLG server 140 then prompts the customer to provide the names and/or Internet protocol (IP) addresses of the source and destination hosts involved in the malfunction or degraded service. Once the customer enters the information [step 620], the SLG server 140 performs two source-routed traceroutes: (1) one from the SLG server 140 to the destination via the source and, (2) one from the SLG server 140 to the source via the destination [step 630]. The SLG server 140 then extracts portions of the traceroutes relevant to the SLG, namely that part of the forward and reverse paths fully contained within the service provider's network (i.e., network 130).

For example, suppose that customer A experiences poor performance, such as high packet loss, in trying to transmit information to destination B. Suppose further that B is a remote device connected to a network other than the network 130, such as network 126. The customer A provides the names and/or addresses of A and B to the SLG server 140. The SLG server 140 then obtains two traceroutes:

S140 X1 X2 X3 X4 A X5 X6 X7 Y1 Y2 Y3 Y4 B

S140 X8 X9 Y5 Y6 Y7 B Y8 Y9 X10 X11 X12 A

The term S140 refers to the SLG server 140. Each of the X and Y terms refers to a router along the path. The X's refer to routers on the network 130 and the Y's refer to routers on other networks.

The relevant portions of the traceroutes for the packet loss SLG include:

A X5 X6 X7

X10 X11 X12 A

Everything else in the traceroutes is either the paths between the SLG server 140 and one of the two endpoints (namely, S140 X1 X2 X3 X4 and S140 X8 X9), which are irrelevant as far as the SLG is concerned, or outside the network 130 (namely, Y1 Y2 Y3 Y4 B and Y5 Y6 Y7 B Y8 Y9), which are not covered by the SLG.

The SLG server 140 provides the traceroutes to the customer [step 640]. The server 140 may do this via email or via similar mechanisms. In an alternative implementation consistent with the present invention, the SLG server 140 provides the traceroutes to the SLG unit 150.

Figure 7:
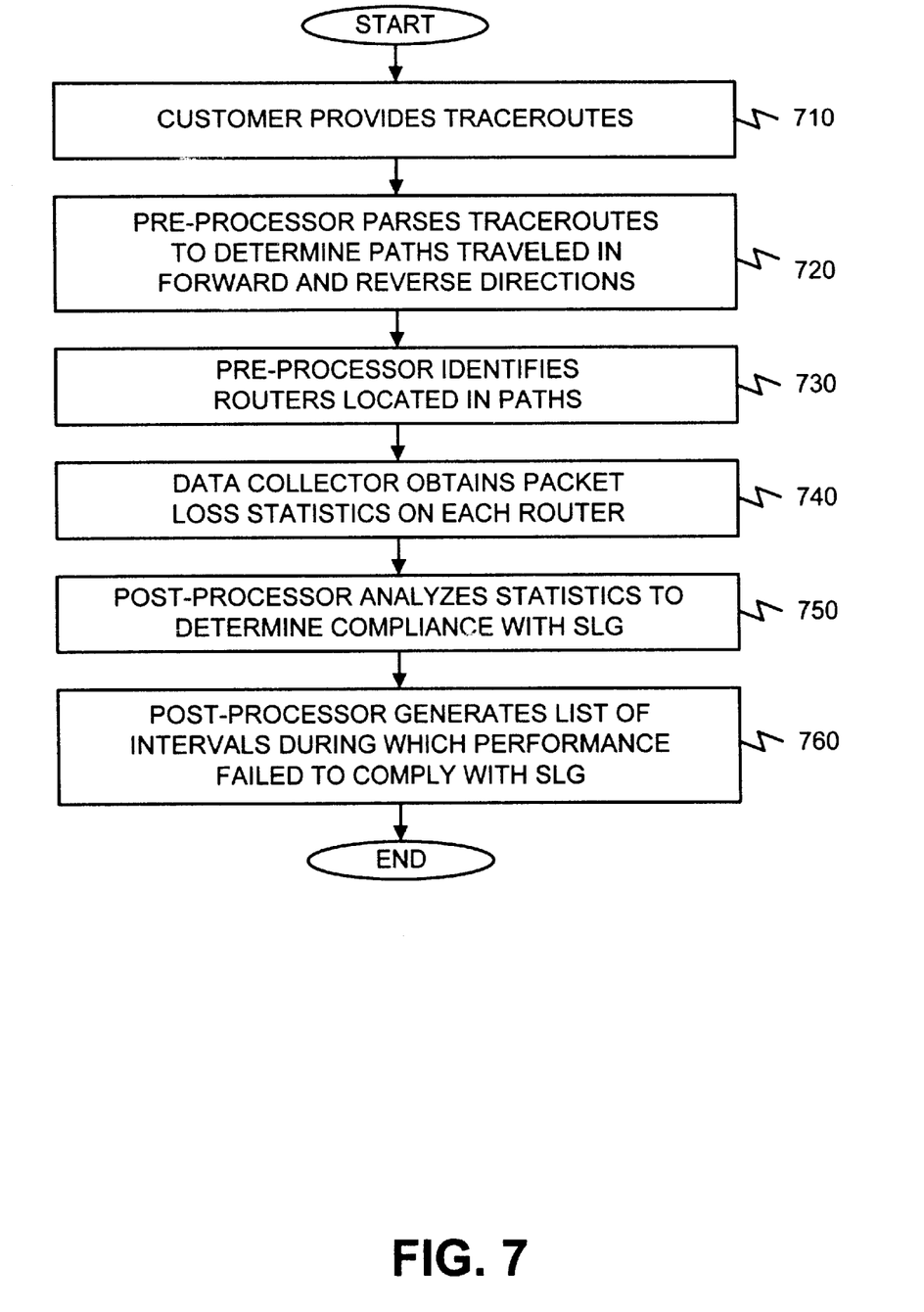
FIG. 7 is a flowchart of processing for monitoring and verifying packet loss service-level guarantees in a manner consistent with the present invention.

FIG. 7 is a flowchart of processing for monitoring and verifying packet loss service-level guarantees in a manner consistent with the present invention. Once the customer receives the traceroutes, the customer sends a claim, including the traceroutes and the time interval in which the malfunction or degraded performance occurred, to the SLG unit 150 [step 710]. The customer may do this by emailing the claim to the SLG unit 150.

Within the SLG unit 150, the pre-processor 520 (FIG. 5) parses the traceroutes to determine the paths traveled in the forward (source-to-destination) and reverse (destination-to-source) directions [step 720]. The pre-processor 520 then generates a list of routers located within each of the paths [step 730]. The pre-processor 520 may create a Uniform Resource Locator (URL) that contains the router list.

The pre-processor 520 sends the URL to the data collector 540. The data collector 540 uses the URL to retrieve packet loss statistics for each of the routers for the time interval specified in the customer's claim [step 740]. The data collector 540 obtains the desired statistics from the statistics the data collector 540 continuously obtains from the routers. The packet loss statistics include a set of measurements routinely collected by the routers, including byte rate, packet rate, discards, and drops, for each router along the path for the entire time interval specified in the customer's claim.

The data collector 540 sends the router measurements to the post-processor 530.

The post-processor 530 analyzes the router measurements to determine whether the SLG was met [step 750]. Since the router measurements are not synchronized with each other and since the routers collect the measurements at different intervals dependent upon router speed, the post-processor 530 may need to resample the data to obtain drop rate estimates for 10-minute periods based on an epoch time (i.e., the number of seconds that have elapsed since Jan. 1, 1970). Other periods are also possible.

To resample, the post-processor 530 partitions time into fixed 10-minute intervals. The post-processor 530 then computes the drop rate for each interval as the weighted arithmetic average of the drop rates for all of the collection intervals that overlap with the fixed intervals. The weight of each term is determined by the amount of time by which its collection interval overlaps with the fixed interval. A collection interval may, for example, be as long as 15 minutes or as short as 0.5 minutes.

The post-processor 530 then combines the link-level drop rates to obtain path-level drop rates. For example, if the round-trip path includes a set of routers i=1, 2, . . . , n and the inbound and outbound drop rate of router i is $r\_i$, then the post-processor 530 approximates the path-level drop rate by:

$$r = 1 - (1 - r\_1)(1 - r\_2) \ldots (1 - r\_n),$$

where each term in the product is the "pass rate" of the corresponding router, and the product is the "pass rate" of the entire path.

To determine whether network performance complied with the SLG, the post-processor 530 may consider several performance criteria, including, for example, a packet threshold, a drop guarantee, and an interval. The packet threshold parameter determines the minimum packet rate (in packets per second) for a router to be considered operational and passing traffic. If the packet rate falls below the threshold, the post-processor 530 considers the packet loss data unreliable.

The drop guarantee parameter determines the minimum packet loss rate (as a fraction of unity) that will be flagged as exceptions by the post-processor 530. The interval parameter determines the duration of the interval (in seconds) over which the drop rate must not exceed the drop guarantee parameter. The post-processor 530 may not analyze the data over a sliding window of the size specified by the interval parameter, but may analyze successive disjoint windows of this duration. Thus, two successive windows where the drop rate is high, but below the SLG, may indicate that there was a period equal to the interval parameter that straddled two windows and for which the drop rate reached or exceeded the SLG.

Using these criteria, the post-processor 530 generates a list of intervals during which network performance failed to comply with the SLG [step 760]. Based on the generated list, the SLG unit 150 determines whether to credit the customer for the degraded performance.

CONCLUSION

Systems and methods consistent with the present invention monitor and validate packet loss service-level guarantees by collecting network performance data and determining whether the performance data complies with the service-level guarantees.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, FIG. 1 shows the devices 110–118 connected to both the SLG unit 150 and the SLG server 140 via network 130. This need not be the case, however. The devices 110–118 may connect to SLG unit 150 and/or the SLG server 140 via different networks, such as the Internet, an intranet, a LAN, a WAN, a public telephone network, or a similar network.

In addition, the SLG unit 150 and SLG server 140 have been described as separate devices. In another implementation consistent with the present invention, these devices are implemented as a single device connected to the network 130.

What is claimed is:

1. A computer-implemented method for monitoring performance in a network having a plurality of routers, comprising:

determining a path in the network between a source and a destination;

identifying routers located on the path;

collecting performance data from the identified routers; and comparing the performance data to at least one performance criteria to determine compliance with a service-level guarantee.

2. The method of claim 1, wherein the determining includes:

receiving at least one traceroute, and identifying the path from the traceroute.

3. The method of claim 1, further comprising:

performing first and second source-routed traceroutes between the source and the destination.

4. The method of claim 3, wherein the determining includes:

parsing the first traceroute to identify a first path from the source to the destination, and parsing the second traceroute to identify a second path from the destination to the source.

5. The method of claim 4, wherein the determining further includes:

discarding portions of the first and second paths located outside the network.

6. The method of claim 1, wherein the determining includes:

identifying a first path from the source to the destination, and identifying a second path from the destination to the source.

7. The method of claim 1, wherein the collecting includes:

obtaining performance data gathered by the identified routers over a plurality of periods.

8. The method of claim 7, wherein the collecting further includes:

partitioning time into a plurality of intervals of fixed duration, determining an amount of overlap between the periods and the intervals, and weighting the performance data based on the amount of overlap of the corresponding period.

9. The method of claim 1, wherein the comparing includes:

combining the performance data from each of the identified routers to obtain path performance data, and using the path performance data in the comparison with the at least one performance criteria.

10. The method of claim 1, wherein the at least one performance criteria includes a packet threshold identifying a minimum packet rate requirement for each of the identified routers for compliance with the service-level guarantee.

11. The method of claim 1, wherein the at least one performance criteria includes a drop guarantee identifying a minimum packet loss rate permitted by each of the identified routers for compliance with the service-level guarantee.

12. The method of claim 1, wherein the at least one performance criteria includes an interval parameter identifying a duration of intervals over which a packet drop rate must be lower than a minimum packet loss rate for compliance with the service-level guarantee.

13. The method of claim 1, wherein the service-level guarantee relates to packet loss; and wherein the collecting includes:

obtaining packet loss statistics from the identified routers including at least one of byte rate, packet rate, a number of packet discards by the identified routers, and a number of packet drops by the identified routers.

14. A system for monitoring performance in a network having a plurality of routers, comprising:

means for determining a path in the network between a source and a destination;

means for identifying routers located on the path;

means for collecting performance data from the identified routers; and means for comparing the performance data to at least one performance criteria to determine compliance with a service-level guarantee.

15. A system that monitors performance in a network having a plurality of routers, comprising:

a pre-processor that determines a path in the network between a source and a destination and identifies routers located on the path;

a data collector that obtains performance data from the identified routers; and a post-processor that compares the performance data to at least one performance criteria to determine compliance with a service-level guarantee.

16. The system of claim 15, wherein when determining the path, the pre-processor is configured to receive at least one traceroute and identify the path from the traceroute.

17. The system of claim 15, further comprising:

a server that performs first and second source-routed traceroutes between the source and the destination.

18. The system of claim 17, wherein when determining the path, the pre-processor is further configured to parse the first traceroute to identify a first path from the source to the destination, and parse the second traceroute to identify a second path from the destination to the source.

19. The system of claim 18, wherein when determining the path, the pre-processor is further configured to discard portions of the first and second paths located outside the network.

20. The system of claim 15, wherein when determining the path, the pre-processor is configured to identify a first path from the source to the destination and a second path from the destination to the source.

21. The system of claim 15, wherein when obtaining performance data, the data collector is configured to collect performance data gathered by the identified routers over a plurality of periods.

22. The system of claim 21, wherein when obtaining performance data, the data collector is further configured to partition time into a plurality of intervals of fixed duration, determine an amount of overlap between the periods and the intervals, and weight the performance data based on the amount of overlap of the corresponding period.

23. The system of claim 15, wherein when comparing the performance data, the post-processor is configured to combine the performance data from each of the identified routers to obtain path performance data, and use the path performance data in the comparison with the at least one performance criteria.

24. The system of claim 15, wherein the at least one performance criteria includes a packet threshold identifying a minimum packet rate requirement for each of the identified routers for compliance with the service-level guarantee.

25. The system of claim 15, wherein the at least one performance criteria includes a drop guarantee identifying a minimum packet loss rate permitted by each of the identified routers for compliance with the service-level guarantee.

26. The system of claim 15, wherein the at least one performance criteria includes an interval parameter identifying a duration of intervals over which a packet drop rate must be lower than a minimum packet loss rate for compliance with the service-level guarantee.

27. The system of claim 15, wherein the service-level guarantee relates to packet loss; and wherein when obtaining performance data, the data collector is configured to collect packet loss statistics from the identified routers including at least one of byte rate, packet rate, a number of packet discards by the identified routers, and a number of packet drops by the identified routers.

28. A computer-readable medium containing instructions for controlling a computer to perform a method for monitoring performance in a network having a plurality of routers, the method comprising:

determining a path in the network between a source and a destination;

identifying routers located on the path;

collecting performance data from the identified routers; and comparing the performance data to at least one performance criteria to determine compliance with a service-level guarantee.

29. A computer-implemented method that validates customer claims relating to performance in a network having a plurality of routers, comprising:

receiving one of the customer claims, the claim identifying a path in the network between a source and a destination and a time interval for which degraded performance was experienced;

identifying routers located on the path;

collecting performance data from the identified routers for a plurality of periods, at least some of the periods overlapping the time interval;

weighting the performance data based on an amount of overlap of the corresponding period with the time interval;

combining the weighted performance data for each of the identified routers to obtain path performance data; and determining compliance with a service-level guarantee based on the path performance data.

30. The method of claim 29, wherein the determining includes:

comparing the path performance data to a set of performance criteria to determine compliance with the service-level guarantee.

31. A system that validates customer claims relating to performance in a network having a plurality of routers, each of the claims identifying a path in the network between a source and a destination and a time interval for which degraded performance was experienced, the system comprising:

a memory that stores instructions; and a processor that executes the instructions stored in the memory to identify routers located on the path, collect performance data from the identified routers for a plurality of periods, at least some of the periods overlapping the time interval, weight the performance data based on an amount of overlap of the corresponding period with the time interval, combine the weighted performance data for each of the identified routers to obtain path performance data, and determine compliance with a service-level guarantee based on the path performance data.

32. A computer-readable medium that stores instructions executable by a computer to perform a method for validating customer claims relating to performance in a network having a plurality of routers, each of the claims identifying a path in the network between a source and a destination and a time interval for which degraded performance was experienced, the method comprising:

identifying routers located on the path;

collecting performance data from the identified routers for a plurality of periods, at least some of the periods overlapping the time interval;

weighting the performance data based on an amount of overlap of the corresponding period with the time interval;

combining the weighted performance data for each of the identified routers to obtain path performance data; and determining compliance with a service-level guarantee based on the path performance data.

33. A method of validating a claim relating to a service-level guarantee, comprising:

receiving the claim from a customer, the claim identifying a first path in a network from a source to a destination, a second path from the destination to the source, and a time interval for which degraded performance was experienced in the network; and validating the claim by collecting performance data reflecting performance of communication along the first and second paths and determining compliance with the service-level guarantee based on the collected performance data.

* * * * *